April 26, 1949.    F. H. FOLEY    2,468,437
SPECTACLE HOLDER
Filed July 23, 1948

INVENTOR.
Frank H. Foley
BY
McMorrow, Berman & Davidson
ATTORNEYS

Patented Apr. 26, 1949

2,468,437

UNITED STATES PATENT OFFICE 2,468,437

SPECTACLE HOLDER

Frank H. Foley, Lorain, Ohio

Application July 23, 1948, Serial No. 40,405

3 Claims. (Cl. 248—204)

This invention relates to holders and supports for spectacles and eyeglasses, and particularly to a special holder for spectacles.

The main object of my invention is to provide a holder or stand for spectacles and the like which has means for locating and supporting the spectacles in effective position to prevent accidental displacement of the spectacles from the holder.

Another object is to provide a holder as outlined having means for preventing the surfaces of the lenses of the spectacles being supported by the holder from being scratched or otherwise damaged.

A further object is to have such a special spectacle holder which may be made in several forms, as for example, in the form adapted to be attached to a wall, and in the form of a stand upon a desk or the like.

An object in this connection is withal to provide a definite place for supporting the spectacles independently of other objects, so that the user will always known where to look for the spectacles when required.

It is also an object of the invention to produce a holder of the indicated type of metal or plastic, or of any suitable material and in simple form as well as at low cost to encourage distribution.

Other objects and advantages of the invention will appear in further detail as the specification proceeds.

In order to facilitate ready comprehension of this invention for a proper appreciation of the salient features thereof, the invention is illustrated on the accompanying drawing forming part hereof, and in which:

Figure 5 is a plan view of another form of the holder adapted to constitute a stand for a desk or the like;

Throughout the views, the same reference numerals indicate the same or like parts.

Figure 1:
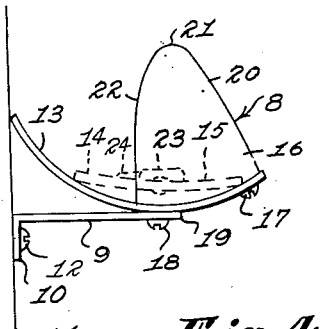
Figure 1 is a side elevation of a spectacle holder made according to the invention and embodying the same in a practical form adapted to be attached to a wall.
Figure 2:
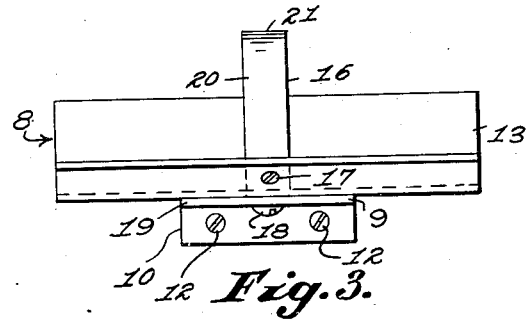
Figure 2 is a front elevation of the same spectacle holder as seen from the right in Figure 1.
Figure 4:
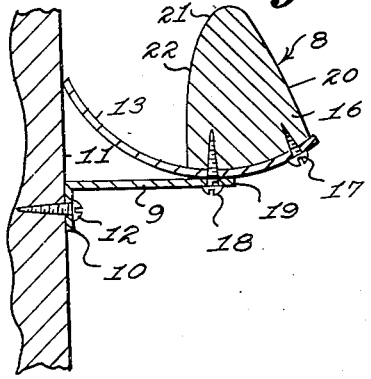
Figure 4 is a vertical section taken on line 4—4 of Figure 3.

It is a common experience to lay spectacles and glasses down on a desk or a table and then presently to find them scratched from contact with grit on the desk or badly scratched or even broken from having fallen on the floor. At other times, it is difficult to find a safe place to lay down the spectacles and the like when they are not needed for a while, or are to be laid aside for the day.

Upon considering this problem, it occurred to me that a holder for spectacles and glasses upon a wall and/or on a desk would form not only a convenience, but an actual necessity. As a result, I have succeeded in producing a spectacle and eye-glass holder or stand avoiding the mentioned disadvantages and fulfilling the foregoing objects, as will now be particularly described.

In the practice of my invention, and referring again to the drawing, a spectacle holder, generally indicated at 8, includes an angle plate 9 having a rear angle portion 10 normally secured to a wall 11 by means of screws 12, while upon the outer end of the plate 9 is located an arcuate concave holder plate 13 of ample width to support a pair of spectacles 14, the curvature of plate or holder 13 being selected to be of considerably shorter radius than the curvature of the glasses or lenses of the spectacles 14, so that only the upper and lower edges of these glasses would be in contact with the plate or holder, as particularly evident at 15.

Figure 3:
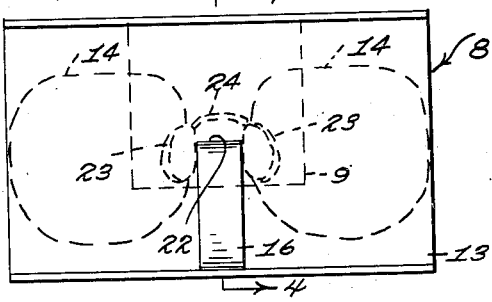
Figure 3 is a plan view of the holder of Figure 2.

Upon the curved holder plate 13, intermediate the ends thereof, is located a center locating block 16 secured to the plate by means of screws 17, 18, the latter passing through the outer end 19 of the angle plate 9, as well as through the curved plate 13, and serves to secure the latter two together simultaneously with the fixing of block 16 upon plate 13. The latter block may be made of rubber, plastic or wood, or even metal, if so desired, and the forward portion 20 is preferably upwardly and rearwardly inclined, while the upper end 21 is rounded and the rear side 22 gently rounded and then dropped straight down to the plate 13, the block serving to project between the nose pads 23, 23 of the glasses or spectacles 14, 14, while the nose-piece 24 is normally disposed rearwardly of block 16 when the spectacles are in place upon the curved holder plate 13, as best seen in Figure 3.

It is obvious that upon the holder just described, it is possible to lay the spectacles or glasses in conveniently accessible position from which they may be removed at any time and then replaced whenever occasion requires, the holder serving several purposes of primarily providing a definite place for the spectacles and then also protecting the latter by virtue of the curved form of plate 13, and also preventing the spectacles from accidentally dropping to the floor by being located upon the holder by means of center locating block 16 between the nose pads 23, 23. This form of the spectacle holder is, of course, best adapted to be attached to a wall, a door, or a door post, etc., being permanently secured thereto by means of the screws 12, 12, as already described.

Figure 5:
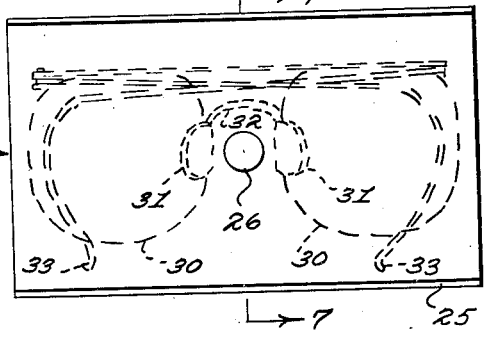
Figure 7:
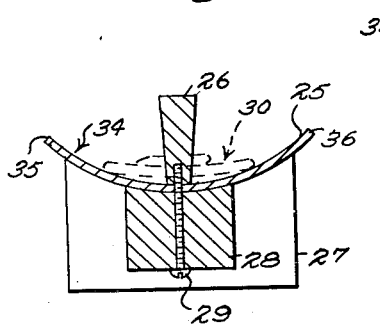
Figure 7 is a vertical section taken on line 7—7 in Figure 5.
Figure 6:
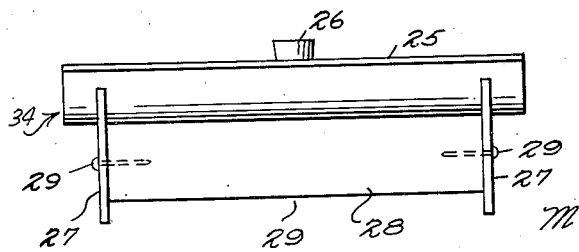
Figure 6 is a front elevation of the same holder or stand as seen from the lower edge in Figure 5.

However, it is also possible to use the same principles in the construction of the spectacle holder when the same is modified sufficiently to be used as a stand upon a desk or table, as illustrated in Figures 5, 6 and 7, wherein the concavely-arcuate holder plate 25 is provided upon substantially its central portion with an upright locating block or post 26 and supported at the ends by means of two upright plates 27, 27 between which is secured a reinforcing block 28 by means of nails or screws 29, 29 extending into the block from the plates 27, 27, while upwardly through the center of the block extends a long screw 29 passing through the curved plate 25 into the center post 26 securing the latter in place upon the plate and simultaneously securing the plate upon block 28.

The arrangement is such that when a pair of glasses 30, 30 is laid upon the curved holder plate 25, the nose pads 31, 31 are located upon both sides of the center post 26, while the nose piece 32 upon the glasses 30, 30 straddles the post, as best seen in Figure 5, and the bows 33, 33 are readily accommodated upon the curved plate 25 when folded down upon said plate. In this form of the spectacle or glasses holder, the end plates 27, 27 serve to stand upon the desk top or table, or any other suitable support while the holder, generally indicated by reference 34, is substantially symmetrical, longitudinally considered, so that the glasses 30, 30 may be laid in upon the curved holder plate 25 from either edge 35 or 36 thereof, the post 26 being in the center of the plate and therefore serving the same purpose in either case.

From the foregoing it is self-evident that the spectacle or eyeglass holder in either case fulfills the same objects and is based on substantially the same principles, and may be made of metal, plastic, wood, or any other material suitable for the purpose and being either attached to a wall or a door or free to be placed upon a desk top or table top, as may be desired.

Manifestly, variations may be resorted to and parts and features may be modified or used without others within the scope of the appended claims.

Having now fully described my invention, I claim:

1. A spectacle or eyeglass holder, including support means adapted to be mounted upon a support, an upwardly-concave arcuate holder plate secured upon the support means, and a central locating block fixed upon the upper arcuate side of the arcuate holder plate in position to be straddled by the nose piece of a pair of glasses or a pair of spectacles when lying upon said arcuate holder plate.

2. A spectacle or eyeglass holder, including an angle plate having a rear angle portion adapted to be attached to a vertical support such as a wall or the like, an upwardly-concave arcuate holder plate secured upon the angle plate, and an upright central locating block secured upon the upper concave side of the arcuate holder plate and extending from the forward edge to the intermediate portion thereof in position to be straddled by the nose piece of a pair of spectacles or eyeglasses when the latter lie upon said arcuate holder plate.

3. A spectacle or eyeglass holder, including a pair of upright end plates, a reinforcing member disposed between and interconnecting the latter end plates, an upwardly-concave arcuate holder plate fixedly mounted upon said end plates and reinforcing member, and an upwardly-projecting center block or post fixed rigidly upon the intermediate portion of the upper concave side of said arcuate holder plate in symmetrical position thereon.

FRANK H. FOLEY.

No references cited.